United States Patent
Rovati et al.

(10) Patent No.: US 6,724,823 B2
(45) Date of Patent: Apr. 20, 2004

(54) VLSI ARCHITECTURE, IN PARTICULAR FOR MOTION ESTIMATION APPLICATIONS

(75) Inventors: Fabrizio Rovati, Cinisello Balsamo (IT); Danilo Pau, Sesto San Giovanni (IT); Luca Fanucci, Pisa (IT); Sergio Saponara, Pisa (IT); Andrea Cenciotti, Pisa (IT); Daniele Alfonso, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 355 days.

(21) Appl. No.: 09/948,131

(22) Filed: Sep. 6, 2001

(65) Prior Publication Data

US 2002/0097343 A1 Jul. 25, 2002

(30) Foreign Application Priority Data

Sep. 7, 2000 (EP) .............................. 00830604

(51) Int. Cl.$^7$ ................................. H04N 7/12
(52) U.S. Cl. .............................. 375/240.17; 375/240.26
(58) Field of Search ....................... 375/240.16, 240.17, 375/240.26, 240.28

(56) References Cited

U.S. PATENT DOCUMENTS

| | | | |
|---|---|---|---|
| 5,742,814 A | * 4/1998 | Balasa et al. | 707/102 |
| 6,025,881 A | * 2/2000 | Kikuchi et al. | 375/240.18 |
| 6,122,320 A | * 9/2000 | Bellifemine et al. | 375/240 |
| 6,606,126 B1 | * 8/2003 | Lim et al. | 348/452 |
| 2003/0202596 A1 | * 10/2003 | Lainema et al. | 375/240.16 |

OTHER PUBLICATIONS

Fanucci, Luca et al., "IP Reuse VLSI Architecture for Low Complexity Fast Motion Estimation in Multimedia Applications," , Proceedings of the 26$^{th}$ Euromicro Conference, pp. 417–424. Sep. 5–7, 2000.

* cited by examiner

*Primary Examiner*—Chris Kelley
*Assistant Examiner*—George A Bugg
(74) *Attorney, Agent, or Firm*—Lisa K. Jorgenson; E. Russell Tarleton; Seed IP Law Group PLLC

(57) ABSTRACT

A VLSI architecture adapted to be implemented in the form of a reusable IP cell and including a motion estimation engine, configured to process a cost function and identify a motion vector which minimizes the cost function, an internal memory configured to store the sets of initial candidate vectors for the blocks of a reference frame, first and second controllers to manage the motion vectors and manage an external frame memory, a reference synchronizer to align, at the input to the estimation engine, the data relevant to the reference blocks with the data relevant to candidate blocks coming from the second controller, and a control unit for timing the units included in the architecture and the external interfacing of the architecture itself.

20 Claims, 6 Drawing Sheets

VLSI ARCHITECTURE, IN PARTICULAR FOR MOTION ESTIMATION APPLICATIONS

BACKGROUND OF THE INVENTION

1. Field of the Invention

The present invention refers to VLSI architectures and, more particularly, to VLSI architectures for real time and low complexity procedures for motion estimation.

2. Description of the Related Art

Motion estimation is a key issue in video coding techniques (for example H.263/MPEG) or image filtering. In particular, algorithms based on predictive spatio-temporal techniques achieve high coding quality with the use of a reasonable computational power by exploiting the spatio-temporal correlation of the video motion field.

Especially in the last decade, multimedia communication techniques have experienced rapid growth and great market success for several applications, including videotelephony, videoconference, distance working and learning, telemedicine, home or kiosk banking, to name but a few. This trend is becoming increasingly marked with the most recent information and communication technologies based on VDSL, ADSL and ISDN lines, also for residential use, and in third generation personal communication systems (IMT-2000). In this scenario, compression of the video signal aimed at reducing the noteworthy quantities of data and transmission frequency required to store and transmit signals, plays a fundamental role. Hence several compression standards, such as H.261, H263 and MPEG (versions 1, 2, 4) were developed, especially by ISO and ITU-T.

In this respect the following papers/works may be usefully referred to:

MPEG2, "Generic Coding of Moving Pictures and Associated Audio", ISO/IEC 13818-2, March 1994;

Telecommunication standardization sector of ITU, "Video Coding for Low Bit rate Communication", Draft 21 ITU-T, Recommendation H.263 Version 2, January 1998;

F. Kossentini et al., "Towards MPEG-4: an Improved H.263 Based Video Coder", Signal Processing: Image Communic, Special Journal, Issue on MPEG-4, vol. 10. pp. 143–148, July 1997.

The relevant codecs call for very powerful hardware architecture. In that respect the use of DSP techniques and advanced VLSI technology is of paramount importance to meet the requirements of low-cost and real time, which are almost mandatory to obtain truly satisfying results on the market.

In this respect, to reduce both time-to-market and the design costs typical of VLSI technology, design reuse methodologies are used extensively. This solution requires the development of VLSI IP (Intellectual Property) cells that are configurable, parametric and synthesizable and thus adapted to be reused in a wide range of applications. In particular, the design of high performance ASIC structures is required for Motion Estimation (ME) applications, which are the most complex part of ISO/ITU-T codecs.

Movement Estimation (ME) systems exploit the temporal correlation between adjacent frames in a video sequence to reduce the data interframe redundancy.

In this regard, works such as:

P. Pirsch et al. "VLSI architectures for video compression, A Survey", Proc. of IEEE, vol. 83, n. 2, pp. 220–246, February 1995;

Uramoto et al. "A Half Pel Precision Motion Estimation Processor for NTSC Resolution Video", Proc. IEEE Custom Integ. Circ. Conf., 1993;

Tokuno et al. "A motion Video Compression LSI with Distributed Arithmetic Architecture", Proc. IEEE Custom Integ. Circ. Conf., 1993;

H. Nam and M. K. Lee, "High Throughput BM VLSI Architecture with low Memory Bandwidth", IEEE Trans. on Circ. And Syst., vol. 45, n. 4, pp. 508–512, April 1998;

L. Fanucci, L. Bertini, S. Saponara et al. "High Throughput, Low Complexity, Parametrizable VLSI Architecture for FS-BM Algorithm for Advance Multimedia Applications", Proc. of the ICECS '99, vol. 3, pp. 1479–1482, September 1999, describe solutions based on the technique currently named Full Search Block-Matching or, in short, FS-BM.

In this technique the current frame of a video sequence is divided into N×N blocks (reference block) and, for each of them, an N×N block in the previous frame (candidate block), addressed by a motion vector (MV), is exhaustively searched for the best matching within a search area range of $(2p_h+N) \times (2p_v+N)$ according to a determined cost function.

This technique achieves a high coding quality at the expense of high computational load and hence it limits a practical real time and low power/cost implementation of the movement estimation.

For example, for typical image formats such as CIF (352*288 pixels) at 30 frames/s, N=16, $p_h=p_v=16$, adopting the Sum of Absolute Difference (SAD) cost function, $3 \times 10^9$ absolute difference (AD) operations per second are required.

The SAD is defined by the formula:

$$SAD(m,n) = \Sigma\Sigma |a(i,j,T) - a(i+n, j+m, T-1)|$$

where the two sums are extended to all i and j values from 0 to N−1, while a (i, j, T) represents the intensity of a generic pixel of the reference block while a (i+n, j+m, T−1) represents the intensity of the corresponding pixel in the candidate block, shifted by a motion vector of coordinates (m, n).

To reduce this computational load while maintaining the same coding quality, several fast motion estimation algorithms were proposed in the literature.

In this regard, in addition to the aforesaid work by F. Kossentini et al., useful reference may be made to the following works:

M. Ghanbari "The Cross Search Algorithm for Motion Estimation", IEEE Trans. Communic., Vol. 38, pp. 950–953, July 1990;

C. -C. J. Kuo et al., "Fast Motion Vector Estimation Using Multiresolution Spatio-Temporal Correlations", IEEE Trans. on Circ. and Syst. for Video Technology, Vol. 7, No. 3 pp. 477–488, June 1997;

A. Ortega et al., "A Novel Computationally Scalable Algorithm for Motion Estimation", VCIP'98, January 1998;

F. Kossentini, R. K. Ward et al., "Predictive RD Optimized Motion Estimation for Very Low Bit-Rate Video Coding", IEEE Journal on Selected Areas in Communications, Vol. 15, No. 9, pp. 1752–1763, December 1997, and to European patent application 00830332.3.

Other relevant papers are: EP97830605.8, EP98830163.6, EP98830484.6, E097830591.0, EP98830689.0, EP98830484.6, EP98830600.7, EP99830751.6.

Other relevant publications are:

F. Rovati, D. Pau, E. Piccinelli, L. Pezzoni, J-M. Bard "An innovative, high quality and search window independent motion estimation algorithm and architecture for MPEG-2 encoding" IEEE 2000 international conference on consumer electronics.

F. Scalise, A. Zuccaro, A. Cremonesi "Motion estimation on very high speed signals. A flexible and cascadable block matching processor", international workshop on HDTV, Turin 1994.

F. Scalise, A. Zuccaro, M. G. Podesta, A Cremonesi, G. G. Rizzotto "PMEP: a single chip user-configurable motion estimator processor for block-matching techniques" 135th SMTPE technical conference.

A. Artieri, F. Jutland "A versatile and Powerful chip for real time motion estimation", ICASSP 1989.

STMicroelectronics "ST13220 motion estimation processor" datasheet, July 1990.

Many of the solutions described in the aforesaid works, based on predictive spatio-temporal algorithms, achieve very good performance in terms of reduced computational load and high coding quality by exploiting the spatial and temporal correlation of the motion vectors field.

In a video sequence, particularly in low bit rate applications, the motion field usually varies slowly with a high correlation along both horizontal and vertical directions: in this regard, see the work mentioned above by C. -C. J. Kuo et al.

By exploiting this correlation, the motion vector of a given block can be predicted from a set of initial candidate motion vectors (MVS) selected from its spatio-temporal neighbors, according to a certain law.

This first step is called predictive phase.

To further reduce the residual error of estimation a refinement process is performed using the predicted motion vector as the starting point.

This second step is called refinement phase.

Several of the works mentioned above are based on this approach. These differ from each other both in the predictive phase (MVS structure or predictor selection law) and the refinement phase (size and shape of the refinement grid, stop search conditions, use of the half-pixel accuracy).

In the work by Kuo et al. mentioned several times above, both spatial and spatio-temporal predictive algorithms were proposed. In the former, for each reference block B (i, j, T) the MVS is made up by the motion vectors of the four spatial neighboring blocks (B (i, j−1, T), B (i−1, j, T), B (i−1, j−1, T), B (i−1, j+1, T)), while in the latter the MVS is made up by the motion vectors of its two spatial and three temporal neighboring blocks (B (i, j−1, T), B (i−1, j, T), B (i, j, T−1), B (i, j+1, T−1), B (i+1, j, T−1)).

In both cases, among the MVS, the motion vector which minimizes a generic cost function is chosen, for example obtained by dividing the SAD by the number of pixels in a block. This cost function is defined as the Mean of Absolute Difference (MAD).

The vector chosen as the best predictor (V0) is used as the starting point for further refinement. In the refinement process, the MAD (V0) is compared with a threshold (TH1). If it is lower, then V0 is chosen as the final motion vector and the search stops; otherwise, an exhaustive search in a 3×3 pixel grid, centered on V0, is performed. If the new minimum MAD corresponds to the center of the grid or it is lower than TH1 the procedure stops. Otherwise, the refinement iterates until one of the above stopping criterion is reached, centering the search grid on the point which minimizes the MAD.

The algorithms also fix the maximum number of iterations (Smax) beyond which the search is stopped. For example, in the work by Kuo et al. mentioned previously, the average of search steps is two for most practical applications.

Alternatively, the work by Ortega et al., mentioned previously, is based on a so-called baseline motion estimation technique.

The main difference regards the cost function adopted, the SAD, and the possibility of performing a half-pixel resolution search as foreseen by the main coding standards.

The European patent application mentioned previously describes a spatio-temporal predictive technique which does not exploit iteration in the refinement phase and hence allows for a constant complexity algorithm. The initial predictive phase, featuring the selection of V0 from a set of four motion vectors using the SAD as cost function, is followed by a refinement phase on a grid centered around the position pointed by V0 and made up of four points on cross directions and four points on diagonal ones. Because this algorithm works with half-pixel precision, the points on cross directions have ½ pixel distance from the center, while the points on the diagonal ones have 1 or 3 pixel distance. The amplitude of the grid corner points is selected according to this rule: If SAD (V0) is greater than TH1 it means that V0 is likely to be a poor predictor and so the search area must be enlarged.

With this approach the refinement phase based on the iterative application of a fixed grid is replaced by the one based on a single step with a flexible grid.

As foreseen by main coding standards, at the end of the motion estimation procedure, the residual matching error must be compared with a threshold TH2 (obviously greater than TH1) to evaluate the convenience of adopting an inter coding strategy rather than an intra coding one. In any case this class of algorithms allows for noteworthy complexity reduction (for some algorithms up to 98%) compared with techniques based on a fill search (FS-BM).

The coding quality is almost the same, while the reduction in PSNR (Peak Signal Noise Ratio) in the worst cases is limited to a tenth of dB, while the Mean Square Error (MSE) increase is less than a few per cent.

BRIEF SUMMARY OF THE INVENTION

From the above, it is evident that spatio-temporal predictive algorithms are potentially very suitable for real time and low complexity motion estimation in multimedia applications with the application of ASIC structures and the use of VLSI technologies.

Therefore, the disclosed embodiments of the present invention provide VLSI architecture that can be utilized for motion estimation applications in real time and with a lower implementation cost.

In the currently preferred embodiment, the architecture proposed in the invention, obtained using a design-reuse methodology, is parametric and configurable and hence it enables the implementation of different predictive algorithms.

Preferably, it features hardware complexity scalability and is suitable for the design of ASICs optimized for a wide range of possible multimedia applications.

In a particularly preferred form of implementation of the invention, foreseen for synthesis with a 0.25 micron CMOS technology, the solution proposed by the invention achieves a computational power up to $740 \times 10^6$ absolute differences per second, for a maximum 0.96 mm$^2$ core size, and permits the processing of typical video sequences at clock frequencies of a few MHz.

In accordance with one embodiment of the invention, a VLSI architecture, particularly for motion estimation applications of video sequences having subsequent frames organized in blocks by means of identification of motion vectors that minimize a given cost function is provided. The architecture is adapted to cooperate with an external frame memory and includes a motion estimation engine configured to process the cost function and identify a motion vector that minimizes it; an internal memory configured to store sets of initial candidate vectors for the blocks of a reference frame; a first controller to manage motion vectors, the first controller configured to provide, starting from the internal memory, the estimation engine with the sets of initial candidate vectors and to update the internal memory with the motion vectors identified by the estimation engine; a second controller to manage the external frame memory, the second controller configured to provide the estimation engine with the candidate blocks; and a reference synchronizer to align, at the input of the estimation engine, the data relevant to the reference blocks with the data relevant to the candidate blocks coming from the second controller.

BRIEF DESCRIPTION OF THE SEVERAL VIEWS OF THE DRAWINGS

The embodiments of the invention are described below, merely as an unlimited example, with reference to the annexed drawings, in which.

DETAILED DESCRIPTION OF THE INVENTION

Figure 1:
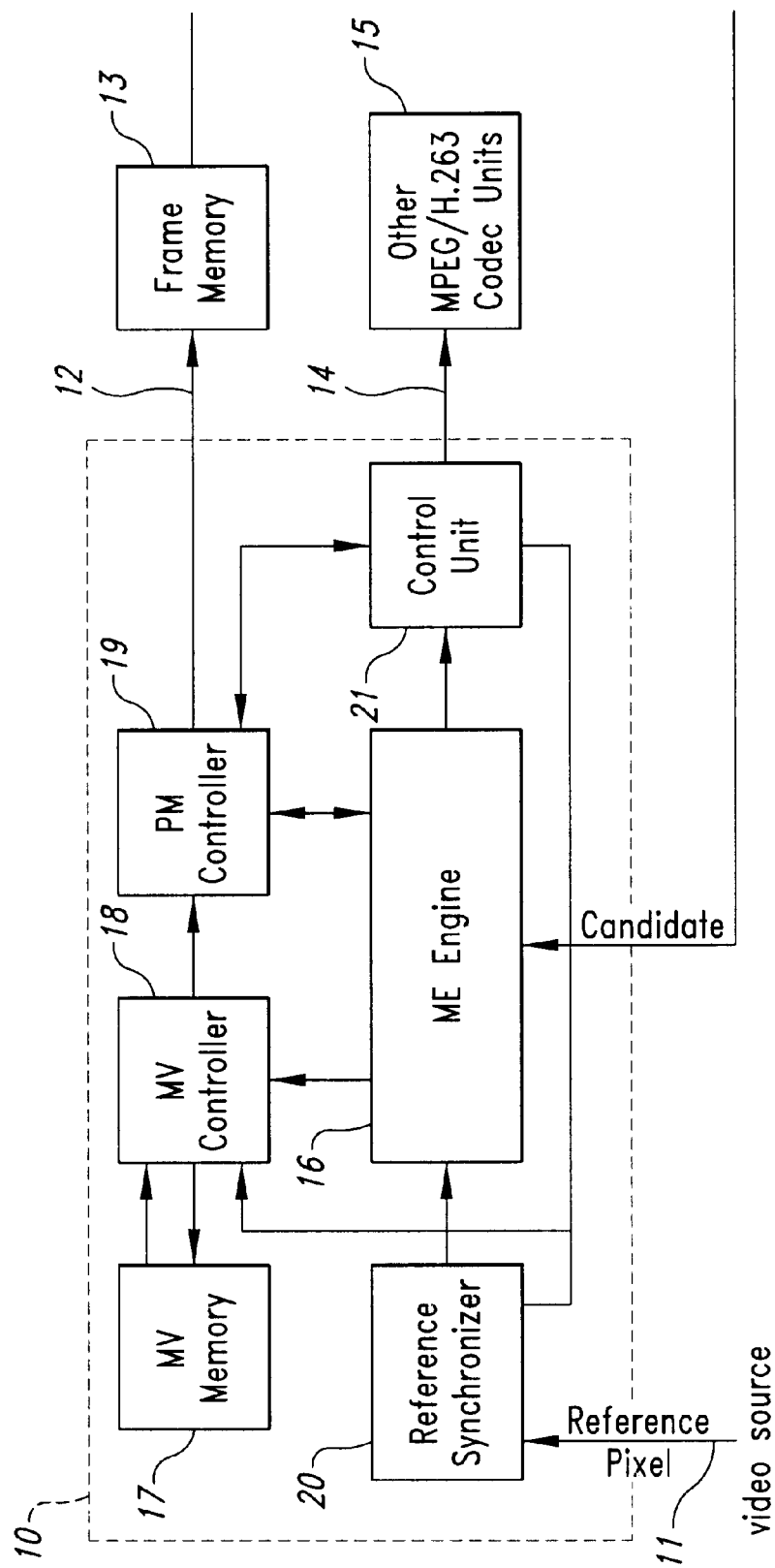
FIG. 1 illustrates, in the form of a block diagram, the organization of the VLSI architecture as claimed in the invention.
Figure 3:
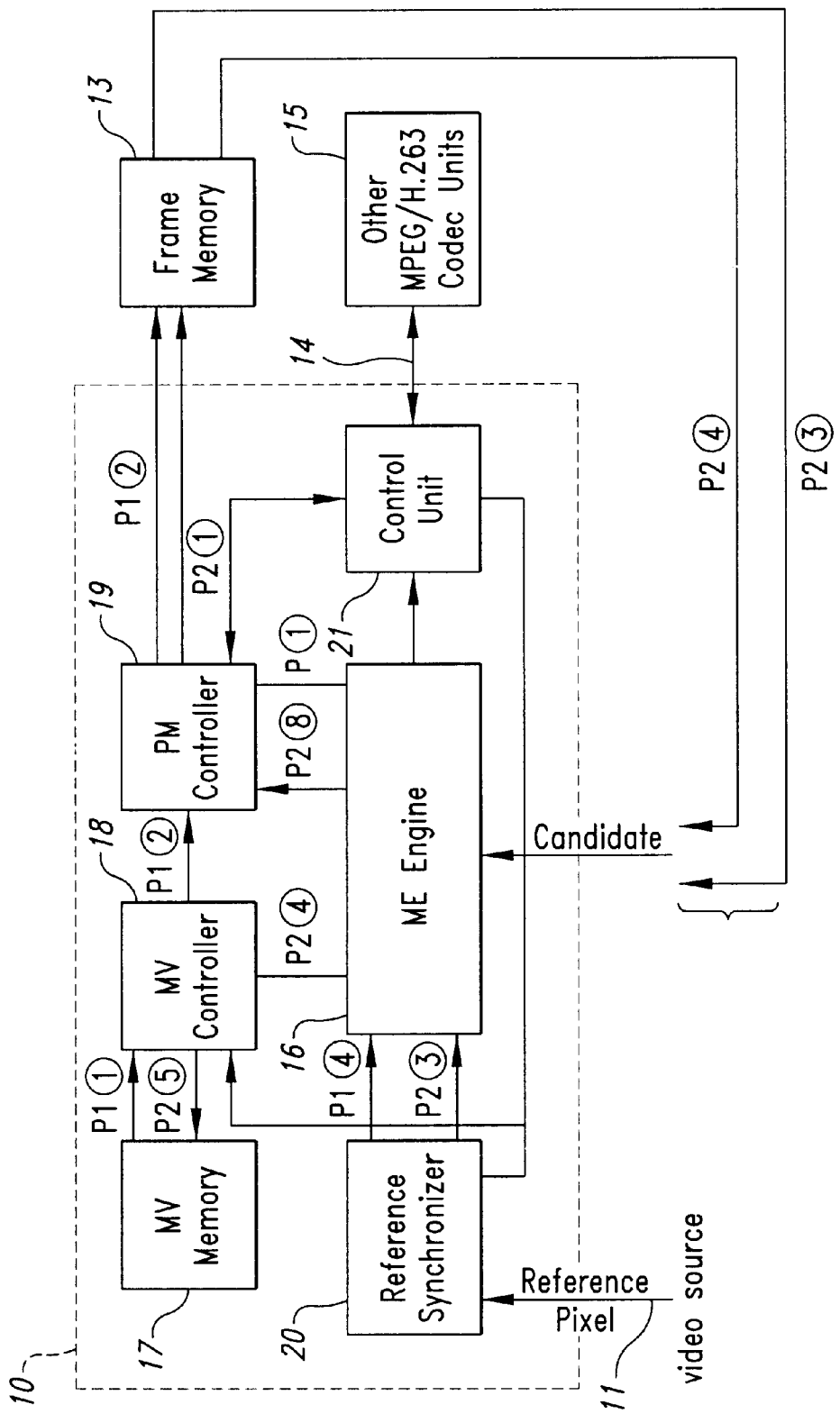
FIG. 3 illustrates the management of data flows within the diagram in FIG. 1, and FIGS. 4 to 6 and FIGS. 7A and 7B, are various diagrams representing the performance of the architecture.

In the diagrams of FIGS. 1 and 3, the numeric reference 10 indicates the architecture, which is adapted to be preferably arranged in the form of a re-usable IP cell.

The architecture 10 is intended to work on signals coming from a video source supplied on an input line 11, cooperating, through a first output line 12, with a frame memory 13 and, through a second output line 14, with the other units included in a codec operating according to standard MPEG/H-263, the said other units being indicated altogether with 15.

Figure 2:
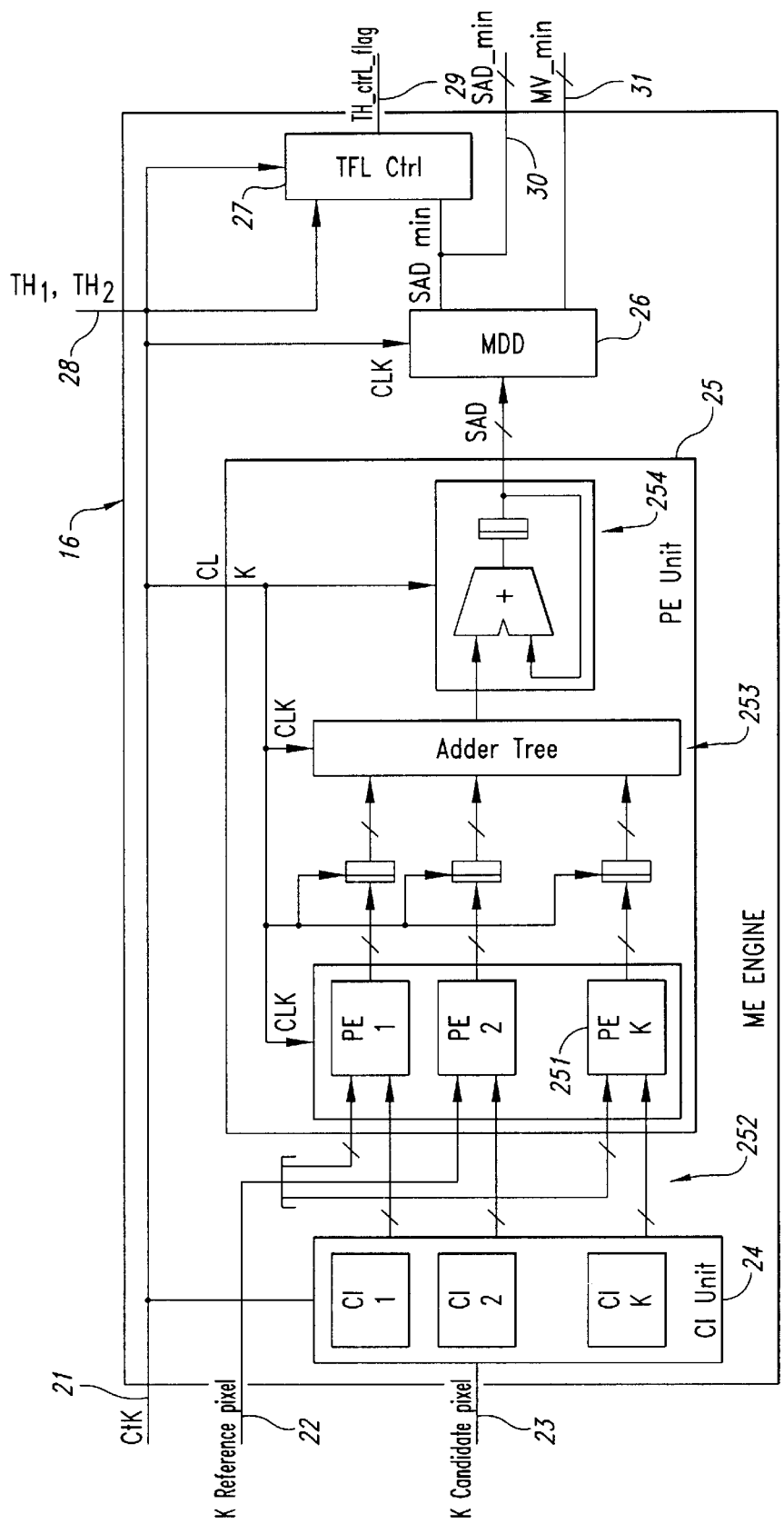
FIG. 2 illustrates, again in the form of a block diagram, the detailed organization of one of the elements represented in FIG. 1.

The main unit of the re-usable IP cell defining the architecture 10 is a motion estimation engine (ME engine) indicated with 16, the organization of which is illustrated in FIG. 2.

Loaded with the proper reference and candidate blocks pixels, the engine 16 is able to process the cost function (for example SAD, MAD or MSE) and identify the motion vector that minimizes it.

This occurs according to the specific organizational methods better described hereunder with reference to FIG. 2 and with respect to criteria that —in their general terms—must be considered known (for example from the various references mentioned in the introduction of this description).

The engine 16 is also able to store and compare the minimum value of the cost function with thresholds programmable by users. Preferably, this incorporates an interpolation subunit that allows the search to be implemented with half-pixel accuracy.

The other units of the architecture 10 represented in the diagram in FIG. 1 are in charge of the management of both data flow and memory resources to permit the implementation of the algorithm functionalities preferably according to pipeline processing. The target is the optimization of the computational throughput achieved compared with the hardware complexity utilized.

In particular, the numeric reference 17 indicates an internal motion vector memory to store the MVS for all the blocks of the reference frame.

Preferably, the size of the memory 17 is parametric, depending on the number of blocks in each frame and the number of bits used to code each motion vector.

For example, in the case of H.263/MPEG applications with low and intermediate bit rates, 12 bits are adopted for each motion vector (each component of the motion vector is defined in a range of [−16, +15, 5] or [−32, +31], without half-pixel accuracy).

For example, table 1 below gives the size of memory 17 required for different video formats.

TABLE 1

| Video format | Size (bit) | Area ($\mu$m) |
|---|---|---|
| QCIF | 1188 | 30056 |
| CIF | 4752 | 120223 |
| 4CIF | 19008 | 480894 |

Reference 18 indicates a controller dedicated to the management of the motion vectors.

During the predictive phase the controller 18 provides, for each reference block, the units dedicated to the V0 selection starting from the MVS read by the memory 17. At the end of the refinement phase, it receives the final motion vector starting from the engine 16 to update the memory 17.

Reference 19 indicates another controller dedicated to the management of the external frame memory 13.

During the predictive and refinement phases this provides the engine 16, pixel by pixel, with the relevant candidate blocks. For this purpose, to minimize access to the frame memory 13, a memory with variable size may be placed in the controller 19 to contain predictive block pixels which may subsequently be reused without having to access the memory 13 again. This variable-size memory may be managed with either a cache or FIFO approach.

The numeric reference 20 indicates a reference synchronizer to align, at the input of the engine 16, the reference block data flow with candidate one. The former is provided with an external video source on the line 11 with a fixed rate depending on the video format (for instance one 16×16 block every 84.17 microseconds for a CIF format at 30 frames/second), while the latter is provided by the controller 19. To this aim a cache memory (N*N byte) (not shown) for the reference blocks is allocated in the synchronizer 20.

A control unit 21 generates the timing signals for all the other units according to the algorithm to be implemented, also interfacing the whole architecture (forming an IP cell) with the rest of the H.263-MPEG codec device.

Analyzing the structure of the engine 16 represented in greater detail in FIG. 2, it can be noted that in addition to the clock signal (line 21), as from the synchronizer 20, the engine 16 also receives the data concerning the reference blocks (line 22) and candidate blocks (line 23).

This occurs according to the modularity parameter K which allows, as will be seen in greater detail later, scalability of the IP cell in terms of computational power and hardware complexity.

In particular, reference 24 indicates a candidate interpolation unit (CI) cooperating with a processing element unit (PE) 25, a minimum distortion detection unit (MDD) 26 and a threshold control unit 27.

The threshold control unit receives the input threshold values TH1 and TH2 on the line 28 (essentially as from the controller 19) and provides the output threshold control flag signal (TH_ctrl_flag) on a line 29.

The other two output lines of the engine 16, indicated with references 30 and 31, both come from the unit 26 and are allocated to convey signals corresponding to the minimum cost function value (for example signal called SAD_min, if the SAD cost function is adopted) and to the motion vector which minimizes this function (MV_min signal).

The foregoing is in view of supplying these signals to the control unit 21.

In the currently preferred embodiment of the invention, the unit 24 is a parametric array of K subunits which, according to half-pixel accuracy specifications, determines the relevant half-pixels starting from the candidate ones stored in the frame memory.

The core of the processing element 25 is composed of another array of K processing elements, each of which is allocated to implement, at pixel level, the chosen cost function, for example the absolute difference operation (for instance SAD, MAD) or the square difference or error one (MSE).

This occurs (according to known criteria) according to the input data from the line 22 (reference block pixels) and on relevant homologous lines, collectively indicated with 252, coming from the single subunits forming the unit 24 (candidate block pixels).

The array 251 is followed by an adder tree 253 (which is obviously skipped if K is equal to 1) and by an accumulator 254 with saturation for the relevant partial sums.

All elements 251, 253 and 254 described above act according to the clock signal coming from the line 21.

Lastly, the unit 26 (also operating, as all other elements included in the engine 16, according to the clock signal on the line 21) identifies the minimum cost function value and the relevant motion vector while the unit 27 compares this minimum with the thresholds TH1 and TH2 (which, as we saw earlier, are programmable by users).

The diagram in FIG. 3 reproduces the diagram in FIG. 1, with particular attention to data flow analysis. This refers to the processing of one block.

During the predictive phase (P1) the controller 18 provides the controller 19 (P1.2) with the all the MVS read starting from the memory 17 (P1.1). The controller 19 reads the relevant candidate blocks in the frame memory 13 and/or from its internal memory, if present (P1.3), and provides the engine 16 (P1.4) with these.

According to the cost function calculation, the engine 16 selects V0 and compares the minimum cost value with the threshold TH1.

The predictive phase is followed by a transition phase (R), during which the result of the previous comparison is analyzed to select the refinement search strategy (for example: grid amplitude, in the case of the solution described in the European patent application mentioned in the introduction to this description; control of the stop criterion in the case of the works by Kuo et al. or Ortega et al. mentioned in the introduction to the description).

Afterwards, V0 is sent to the controller 19 (R.1) to be added to the set of updating vectors, coming from the control unit 21, in order to generate the refinement search grid.

According to the structure of the chosen grid, during the refinement phase (P2) the controller 19 obtains the relevant candidate blocks in the frame memory and/or from its internal memory where present (P2.1), providing the engine 16 (P.2.2) with these.

The engine 16 selects the minimum cost function value and its relevant motion vector. Depending on the selected algorithm specification, this motion vector can be sent to the controller 19 (P2.3) to iterate the refinement process or to the controller 18 (P2.4) to update the memory 17 (P2.4) and to stop the search (for the iterative algorithms this means that one of the stop criterion has been reached).

Finally, the residual matching error is compared with a threshold TH2 to evaluate the convenience of adopting an inter coding strategy rather than an intra coding one.

The architecture illustrated enables implementation of the main spatio-temporal predictive algorithms described in the introduction to this description.

This result can be achieved by employing a hierarchical top-down approach for the architectural description, both in C++ and VHDL (Very high-speed integrated circuits Hardware Description Language).

In particular, first a parametric high level description and then an ad-hoc RLT description can be adopted. After the design of a baseline architecture for the common core of the motion estimation technique, the architecture can be adapted to the specific algorithmic requirements adopting different strategies.

A first solution uses parametric data structures independent from any specific algorithm requirement. For example, the size of memory 17 and the relevant management by the controller 18 are based on parametric equations, with universal value. This is also true both for the pattern of update vectors provided by the controller 19 for the calculation of the refinement grid and for the size K of the array 251 in the engine 16.

An alternative solution uses multiple architecture for a same feature foreseen by VHDL. For each array element a single VHDL entity is designed which defines its interface in the hierarchical structure, with three relevant architectures for the implementation of three different cost functions (SAD, MSE, MAD). Likewise, different architectures are designed for the subunit of the control unit 21 which controls the stop criteria and the selection of the refinement grid. Before starting the synthesis of the designed IP, the description parameters and entity-architecture pairs must be defined. Afterwards, the so-called gate-netlist for the selected library is obtained by means of logic synthesis.

Therefore, starting from a single IP cell the implementation of a scalable integrated circuit family, suitable for a wide range of applications, is granted.

The exhaustive modeling of the IP cell in C++ and VHDL languages is suitable for its use in hardware/software codesign tools for single-chip integration of complex multimedia systems.

The architecture 10 represented in the diagram in FIG. 3 may be implemented, for example, with semi custom standard cells in a 0.25 $\mu$m CMOS technology for CIF and QCIF image formats at 30 frames/s.

Different values can be considered for the K parameter in order to assess the scalability of the IP cells in terms of computational power and hardware complexity.

In particular, two types of algorithm were considered to define the architectural parameters.

In the first case (which is referred to hereinafter as type A) the cost function is SAD and N has been chosen as equal to 16, using arrays of MVS and update vectors of the type described in the work by Ortega et al. already referred to several times. All this using half-pixel accuracy with a Smax value equal to 8.

In the second case (which is referred to hereinafter as type B), although still using a SAD cost function, the choice of value N=16 and half-pixel accuracy, the configurations of MVS and update vectors described in the European patent application referred to several times in the introduction of this description were adopted.

Figure 4:
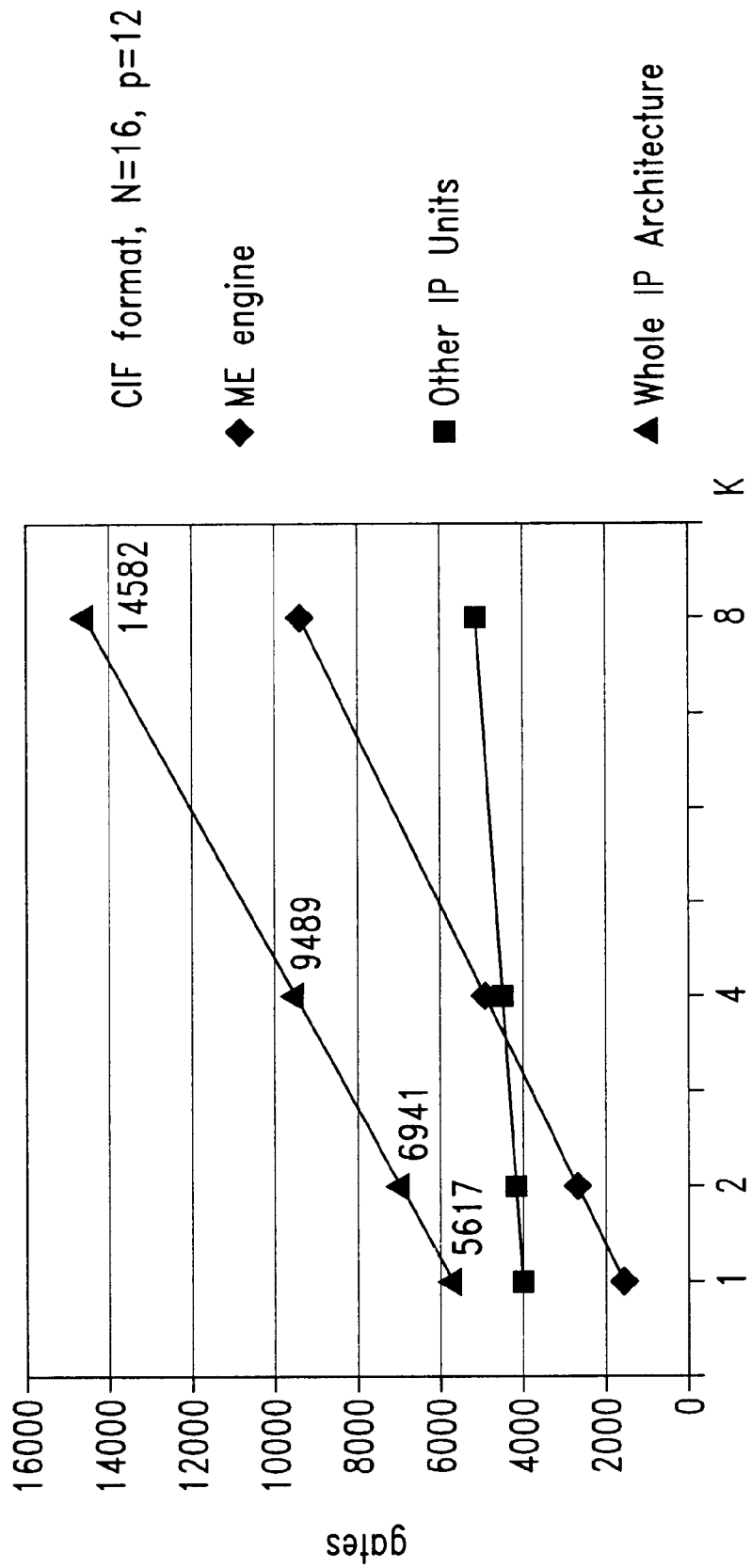

FIG. 4 shows the relevant standard logic complexity values expressed in terms of equivalent gates (ordinate), compared with the K parameter (abscissa) for type A architecture. The diagram also highlights the contribution of the engine 16 and all the other IP units. From the analysis of FIG. 4 it is understood that the IP total complexity increases with K. This is mainly due to the engine 16, since the other units have a much smaller dependency compared with the K parameter.

Figure 5:
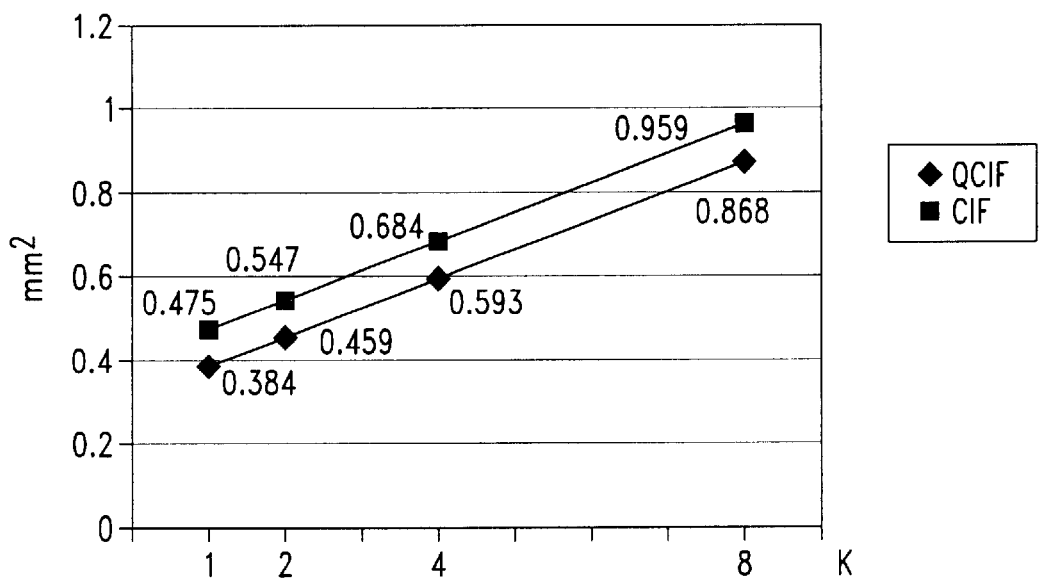

The diagram in FIG. 5 shows in the ordinate the total core size (standard logic cells plus memory resources on the CIF) obtained according to the K value (abscissa) in the case of type A architecture for different cases of practical interests. Similar results were obtained for type B architecture.

These results demonstrate that the architecture 10 is characterized by a very low hardware complexity for main video formats and different K values.

In the worst case of K=8, for a CIF format, there is a complexity of 14600 gates for a total core size of about 0.96 mm². These results also allow implementation with FPGA technology.

Figure 6:
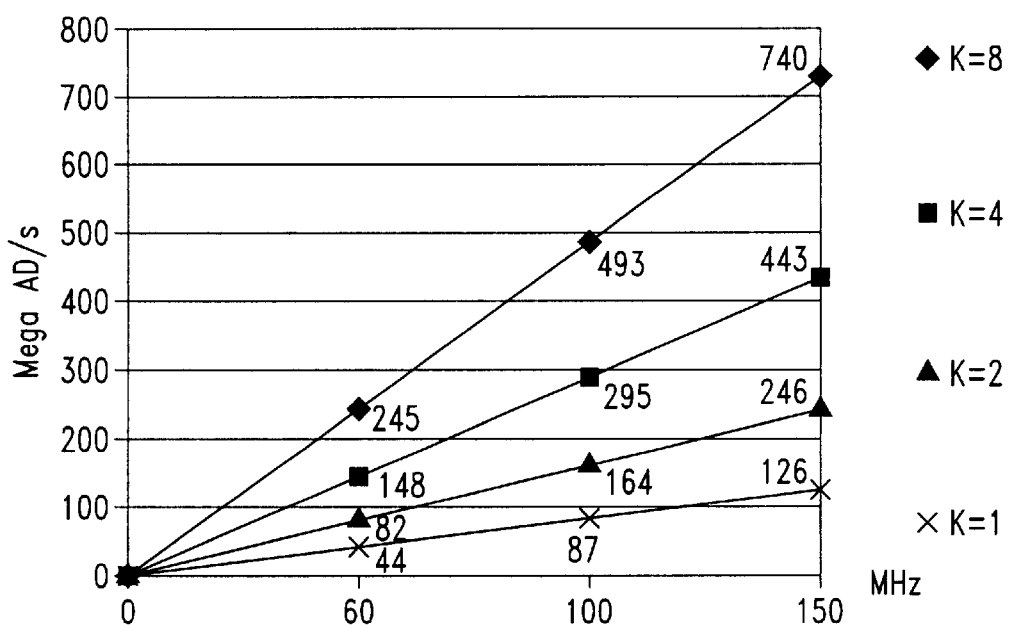

FIG. 6 indicates in the ordinate the data relevant to the computational power of the architecture, expressed in terms of Mega AD/s for different clock frequencies (abscissa) and K values.

It can be seen that by controlling the K parameter it is possible, starting from a single IP cell, to generate a scalable integrated circuit family in view of implementation of a motion estimation of the predictive type suitable for a wide range of applications with a computational power up to $740 \times 10^6$ AD/s.

Figure 7A:
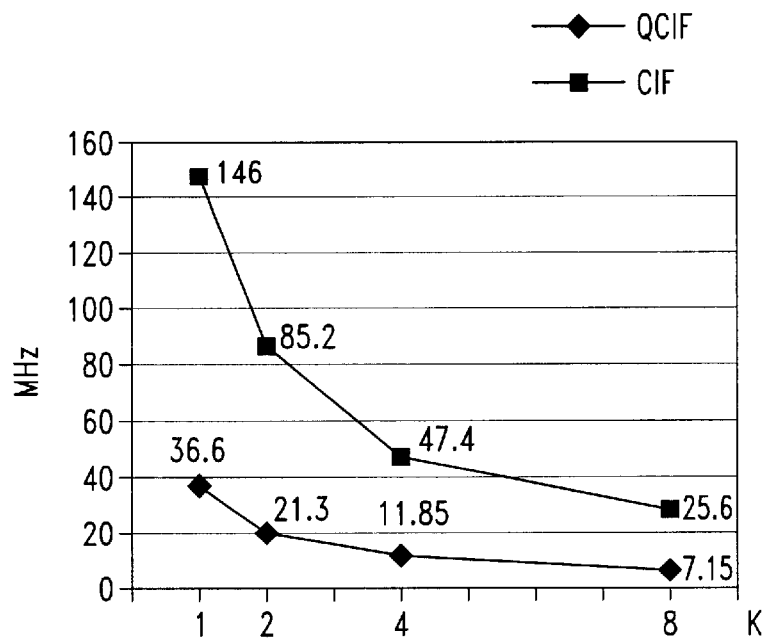
Figure 7B:
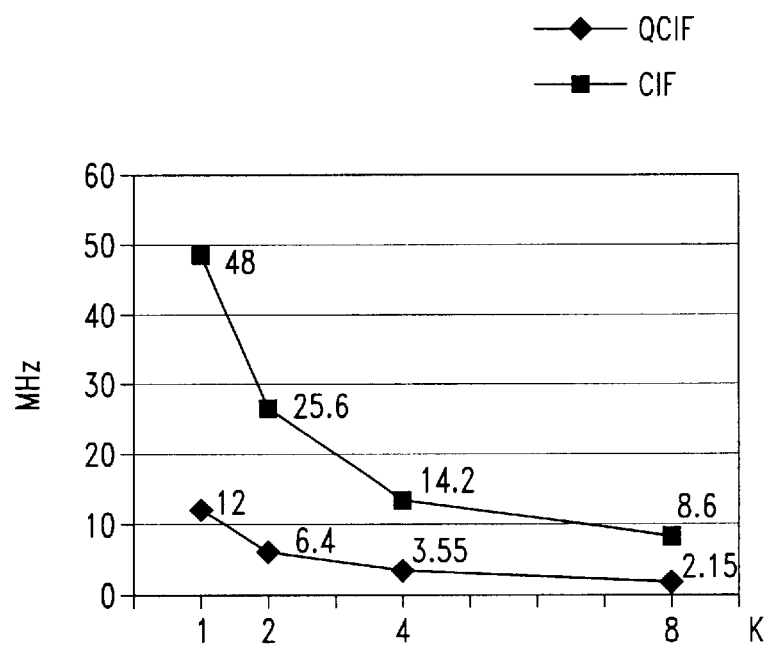

FIG. 7 shows the minimum clock frequencies required (ordinate) compared to K (abscissa) for real time applications of the considered type A (FIG. 7a) and B (FIG. 7b) algorithms, taking into account CIF and QCIF formats.

It is evident that the increased computational power, provided by a greater value of K, determines a hyperbolic decrease of the clock frequency requirement to a few MHz for cases of practical interest.

Finally, table 2 below gives the comparison data, in terms of circuit complexity (expressed as the number of transistors), between a solution according to the invention (in the case of K=8) and the main systolic ones proposed in some of the works referred to in the introduction to this description to implement an FS/BM estimation.

As can be seen, a reduction ranging from 66 to 93% can be obtained.

TABLE 2

| | Transistor (Kilo) |
|---|---|
| Core Architecture | |
| Architecture according to the invention | 58 |
| Uramoto et al. | 405 |
| Tokuno et al. | 540 |
| Nam and Lee | 880 |
| ALPHA-B N/2 = 8 Fanucci et al. | 173 |
| ALPHA-B N/2 = 16 Fanucci et al. | 396 |

These results are without doubt interesting considering that, as seen previously, these predictive algorithms feature the same quality of coding as the full search (FS) algorithms.

The solution according to embodiments of the invention thus permits implementation of real time and low complexity fast motion estimation algorithms for multimedia applications. The relevant IP cell is parametric and configurable and hence permits implementation of different spatio-temporal predictive motion estimation algorithms.

The architecture is also scalable in terms of hardware complexity and allows for the design of an ASIC family optimized for a wide range of multimedia applications requiring different video formats, computational powers and area sizes. The solution according to the invention hence permits real time processing, at clock frequency of a few MHz, of typical 30 frames/s CIF and QCIF video sequences. All this obtaining a remarkable reduction of hardware complexity compared to FS-BM type implementations while maintaining the high video quality suitable for H.263/MPEG applications.

Naturally, although the principle of the invention remains the same, the details of implementation and forms of actuation may be widely varied in relation to the descriptions and illustrations given, while remaining within the sphere of the present invention as defined in the claims below.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A VLSI architecture, particularly for motion estimation applications of video sequences having subsequent frames organized in blocks by means of identification of motion vectors that minimize a given cost function, the architecture adapted to cooperate with an external frame memory and comprising:
   a motion estimation engine configured to process the cost function and identify a motion vector that minimizes the cost function;
   an internal memory configured to store sets of initial candidate vectors for blocks of a reference frame;
   a first controller to manage motion vectors, the first controller configured to provide, starting from the internal memory, the motion estimation engine with the sets of initial candidate vectors and to update the internal memory with the motion vectors identified by the motion estimation engine;
   a second controller to manage the external frame memory, the second controller configured to provide the motion estimation engine with the candidate blocks; and
   a reference synchronizer to align, at the input of the motion estimation engine, data relevant to the blocks of the reference frame with data relevant to the candidate blocks coming from the second controller.

2. The architecture of claim 1, further comprising a control unit for timing of the architecture and external interfacing of the architecture.

3. The architecture of claim 1, wherein the estimation engine is configured to store and compare the minimum value of the cost function with at least one given threshold.

4. The architecture of claim 3, wherein the at least one data threshold can be programmed selectively.

5. The architecture of claim 1, wherein the internal memory is of a size parametrizable according to at least one of the parameters selected in the group consisting of:
   number of blocks in each frame, and
   number of bits used to code the motion vectors.

6. The architecture of claim 1, wherein the motion estimation engine comprises at least one interpolation unit for the implementation of a search of the motion vector with half-pixel accuracy.

7. The architecture of claim 6, wherein the interpolation unit operates on the data deduced by the frame memory.

8. The architecture of claim 6 wherein the interpolation unit is organized in the form of a plurality of subunits.

9. The architecture of claim 1, wherein the motion estimation engine comprises a respective plurality of elements to process the said cost function.

10. The architecture of claim 8, wherein the number of plurality of elements is parametrizable to permit scalability of the architecture.

11. The architecture of claim 9, wherein the respective plurality of elements is followed by an adder tree and by an accumulator for partial sums.

12. The architecture of claim 1, wherein the motion estimation engine comprises a detection unit that detects the minimum value of the cost function and a relevant motion vector.

13. The architecture of claim 1, wherein the motion estimation engine comprises a comparison unit configured to compare a residual matching error with a respective threshold.

14. The architecture of claim 13, wherein the respective threshold can be programmed selectively.

15. The architecture of claim 1, wherein the second controller integrates a memory for temporary storage of the pixels of predictive candidates.

16. A reusable cell architecture, comprising:
   a motion estimation engine configured to process a cost function and to identify a motion vector that minimizes the cost function;
   an internal memory configured to store sets of initial candidate vectors for blocks of a reference frame;
   a first controller to manage motion vectors, the first controller configured to provide, starting from the internal memory, the motion estimation engine with the sets of initial candidate vectors and to update the internal memory with the motion vectors identified by the estimation engine;
   a second controller to manage an external frame memory, the second controller configured to provide the estimation engine with the candidate blocks; and
   a reference synchronizer to align, at the input of the motion estimation engine, data relevant to the blocks of the reference frame with data relevant to the candidate blocks coming from the second controller; and
   a control unit for timing the VLSI architecture and external interfacing of the architecture.

17. A reusable cell architecture adapted to cooperate with an external frame memory for use with video sequences having subsequent frames organized in blocks by means of identification of motion vectors that minimize a given cost function, the architecture comprising:
   a motion estimation engine configured to process the cost function and to identify a motion vector that minimizes the cost function, the motion estimation engine comprising at least one interpolation unit for the implementation of a search of the motion vectors with half-pixel accuracy;
   an internal memory configured to store sets of initial candidate vectors for blocks of a reference frame;
   a first controller to manage motion vectors, the first controller configured to provide, starting from the internal memory, the motion estimation engine with the sets of initial candidate vectors and to update the internal memory with the motion vectors identified by the estimation engine;
   a second controller configured to manage the external frame memory, the second controller further configured to provide the motion estimation engine with the candidate blocks;
   a reference synchronizer to align, at the input of the motion estimation engine, data relevant to the blocks of the reference frame with data relevant to the candidate blocks coming from the second controller; and
   a control unit for timing of the architecture and external interfacing of the architecture.

18. A reusable cell architecture adapted to cooperate with an external frame memory for use with video sequences having subsequent frames organized in blocks by means of identification of motion vectors that minimize a given cost function, the architecture comprising:
   a motion estimation engine configured to process the cost function and to identify a motion vector that minimizes the cost function, the motion estimation engine comprising at least one interpolation unit for the implementation of a search of the motion vectors with half-pixel accuracy, and further comprising a respective plurality of circuits configured to process the cost function followed by an adder tree and by an accumulator for calculating partial sums;
   an internal memory configured to store sets of initial candidate vectors for blocks of a reference frame;
   a first controller to manage motion vectors, the first controller configured to provide, starting from the internal memory, the motion estimation engine with the sets of initial candidate vectors and to update the internal memory with the motion vectors identified by the estimation engine;
   a second controller configured to manage the external frame memory, the second controller further configured to provide the motion estimation engine with the candidate blocks;
   a reference synchronizer to align, at the input of the motion estimation engine, data relevant to the blocks of the reference frame with data relevant to the candidate blocks coming from the second controller; and
   a control unit for timing of the architecture and external interfacing of the architecture.

19. A reusable cell architecture for use with video sequences having subsequent frames organized in blocks by means of identification of motion vectors that minimize a given cost function, the architecture adapted to cooperate with an external frame memory, the architecture comprising:
   a motion estimation engine configured to process the cost function and to identify a motion vector that minimizes the cost function, the motion estimation engine comprising a detection unit that detects the minimum value of the cost function and a relevant motion vector;
   an internal memory coupled to the motion estimation engine and configured to store sets of initial candidate vectors for blocks of a reference frame;
   a first controller coupled to the motion estimation engine for managing motion vectors, the first controller configured to provide, starting from the internal memory, the motion estimation engine with the sets of initial candidate vectors and to update the internal memory with the motion vectors identified by the motion estimation engine;

a second controller coupled to the first controller and to the motion estimation engine, the second controller configured to manage the external frame memory and to provide the motion estimation engine with the candidate blocks; and a reference synchronizer coupled to the motion estimation engine and configured to align at the input of the motion estimation engine data relevant to the blocks of the reference frame with data relevant to the candidate blocks sent from the second controller.

20. A reusable cell architecture for use with video sequences having subsequent frames organized in blocks by means of identification of motion vectors that minimize a given cost function, the architecture adapted to cooperate with an external frame memory, the architecture comprising:

a motion estimation engine configured to process the cost function and to identify a motion vector that minimizes the cost function, the motion estimation engine comprising a detection unit that detects the minimum value of the cost function and a relevant motion vector, and further comprising a comparison unit configured to compare a residual matching error with a respective threshold;

an internal memory coupled to the motion estimation engine and configured to store sets of initial candidate vectors for blocks of a reference frame;

a first controller coupled to the motion estimation engine for managing motion vectors, the first controller configured to provide, starting from the internal memory, the motion estimation engine with the sets of initial candidate vectors and to update the internal memory with the motion vectors identified by the motion estimation engine;

a second controller coupled to the first controller and to the motion estimation engine, the second controller configured to manage the external frame memory and to provide the motion estimation engine with the candidate blocks; and a reference synchronizer coupled to the motion estimation engine and configured to align at the input of the motion estimation engine data relevant to the blocks of the reference frame with data relevant to the candidate blocks sent from the second controller.

\* \* \* \* \*